May 2, 1944.   A. BRIECHLE ET AL   2,347,732
CAMERA
Original Filed March 22, 1938   3 Sheets-Sheet 1

INVENTORS
Ambrosius Briechle, Roy T. Hurley
and George E. Merritt
BY F. Bascom Smith
ATTORNEY.

May 2, 1944.  A. BRIECHLE ET AL  2,347,732
CAMERA
Original Filed March 22, 1938  3 Sheets-Sheet 2
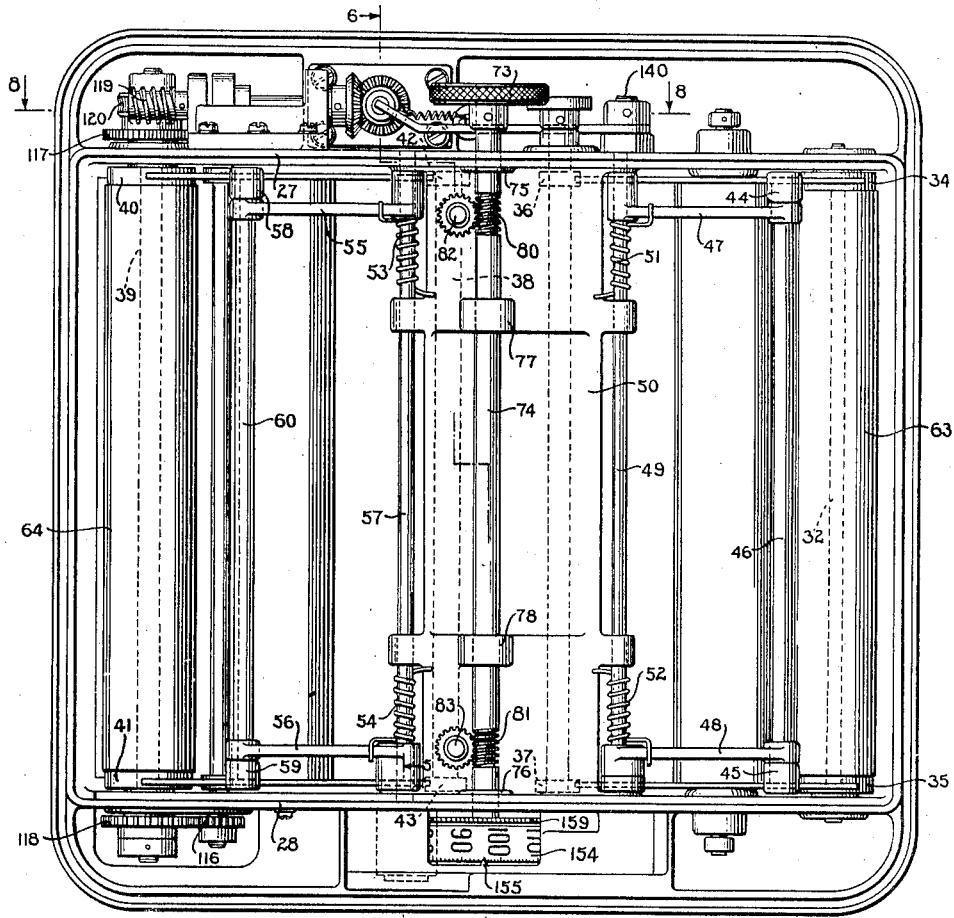
Fig 3
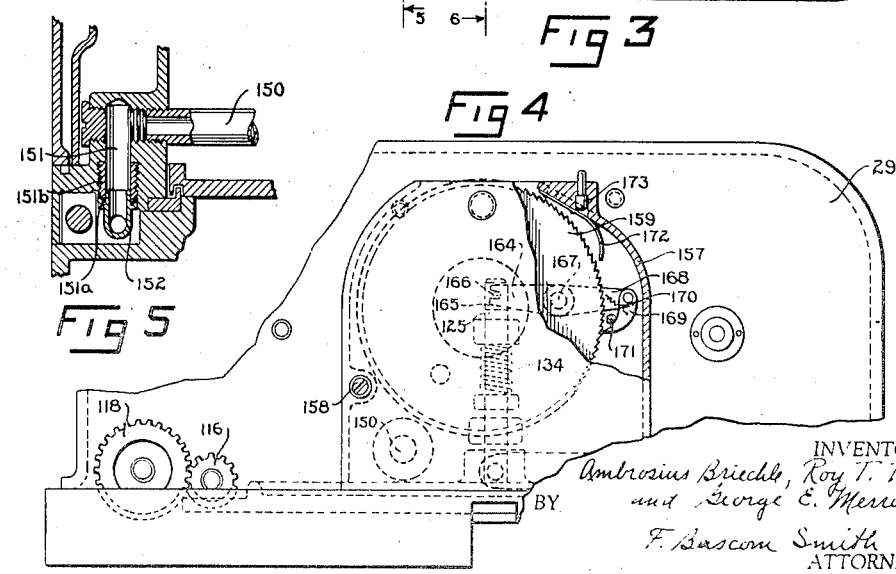
Fig 4
Fig 5
INVENTORS
Ambrosius Briechle, Roy T. Hurley
and George E. Merritt
BY F. Bascom Smith
ATTORNEY.

May 2, 1944.  A. BRIECHLE ET AL  2,347,732
CAMERA
Original Filed March 22, 1938   3 Sheets-Sheet 3
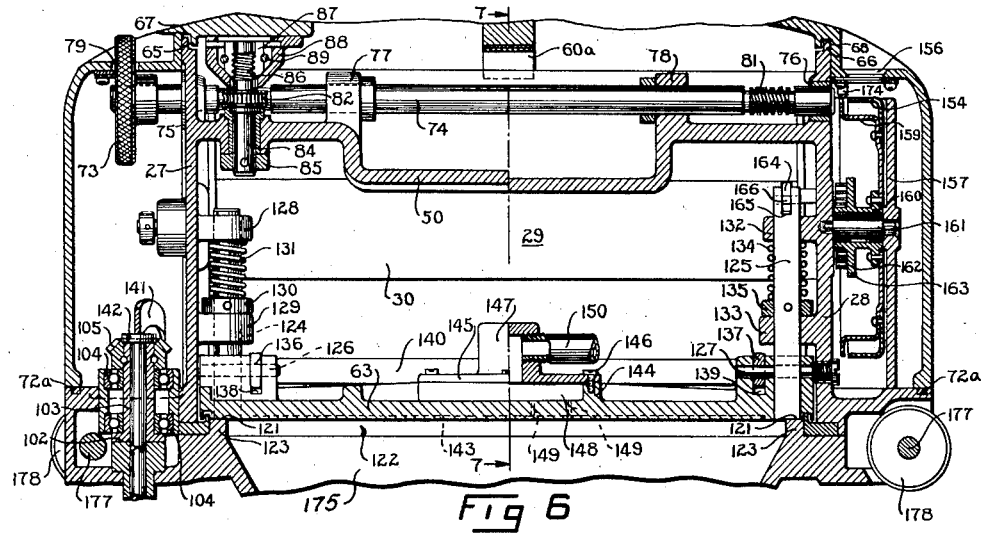
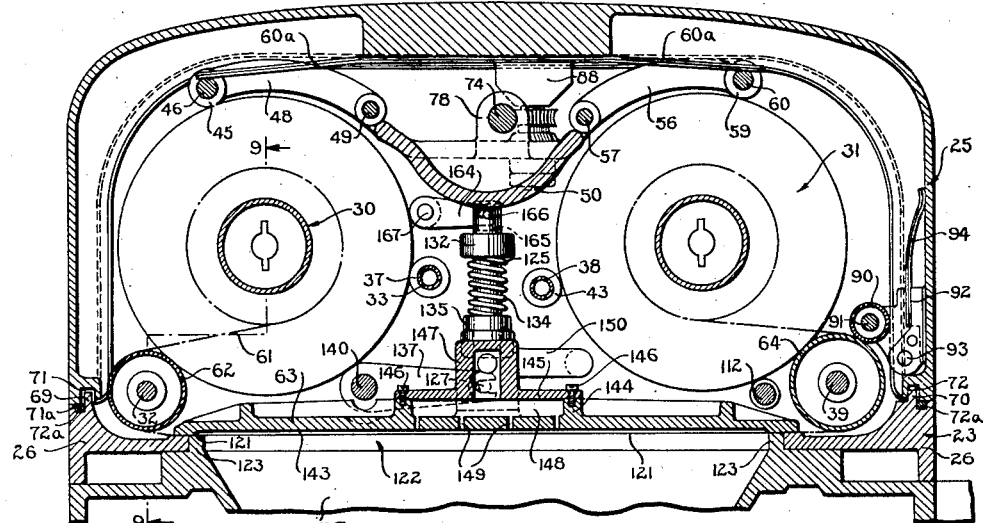
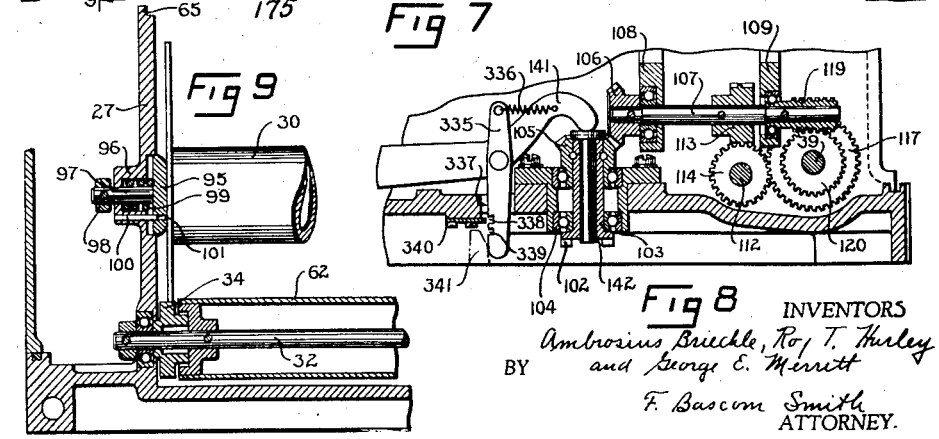
INVENTORS
Ambrosius Briechle, Roy T. Hurley
and George E. Merritt
BY F. Bascom Smith
ATTORNEY.

Patented May 2, 1944

2,347,732

UNITED STATES PATENT OFFICE 2,347,732

CAMERA

Ambrosius Briechle, Brooklyn, Roy T. Hurley, Dobbs Ferry, and George E. Merritt, Staten Island, N. Y., assignors to Bendix Aviation Corporation, South Bend, Ind., a corporation of Delaware Original application March 22, 1938, Serial No. 197,402, now Patent No. 2,283,788, dated May 19, 1942. Divided and this application November 22, 1940, Serial No. 366,680

6 Claims. (Cl. 242—71)

This invention relates to camera apparatus, and more particularly to film containing and controlling mechanism for such apparatus.

This application is a division of our parent copending application Serial No. 197,402, filed March 22, 1938, for Bombing camera, which issued as Patent No. 2,283,788 on May 19, 1942.

An object of the present invention is to provide a camera with novel film containing means whereby the film may be readily located and retained in a predetermined position.

Another object is to provide novel apparatus for accurately metering the film, for example, of an aerial camera.

A further object is to provide a camera having a film magazine and a cover, with novel film roll retaining means adapted to facilitate film loading and metering.

Still another object is to provide a film magazine with novel means adapted to render the magazine light-tight when removed from the camera.

Further objects are to provide a novel camera wherein the operating means are housed in two detachable sections and novel means whereby said sections can be locked to each other.

A still further object is to provide novel metering means in the magazine and cover of a camera, said means being adapted to facilitate the film threading and film roll adjustment.

Still another object is to provide novel locking means for fixing a cover to the film magazine, which means automatically hold the cover against release when the latter is properly positioned on the magazine.

A further object is to provide novel means for actuating the film metering and film holding mechanism.

The above and further objects and novel features of the invention will more fully appear from the following description when the same is taken in connection with the accompanying drawings. It is to be expressly understood, however, that the drawings are for the purpose of illustration only and are not intended to define the limits of the invention, reference being primarily had for this latter purpose to the appended claims.

In the drawings, wherein like reference characters refer to like parts throughout the several views, Fig. 1 is a front elevation, with parts broken away and partly in section, of one embodiment of the present invention, showing a cone, a magazine and a cover in normal operative positions;

Fig. 3 is a detail top plan view of the magazine with the cover removed;

Fig. 4 is a rear elevation of the magazine with the cone and cover removed and with parts broken away to show the details of the counter structure;

Fig. 5 is a sectional view taken substantially on line 5—5 of Fig. 3 with the cone and cover in operating position and showing the fluid conduit connection from the cone to the magazine;

Fig. 6 is a sectional view taken substantially on line 6—6 of Fig. 3 with the cone and cover in operating position;

Fig. 7 is a similar view taken on line 7—7 of Fig. 6;

Fig. 8 is a sectional view taken substantially on line 8—8 of Fig. 3 and showing a means for locking the pressure plate against accidental or inadvertent movement after removal of the cone;

Fig. 9 is a sectional view taken substantially on line 9—9 of Fig. 7.

Figure 1:
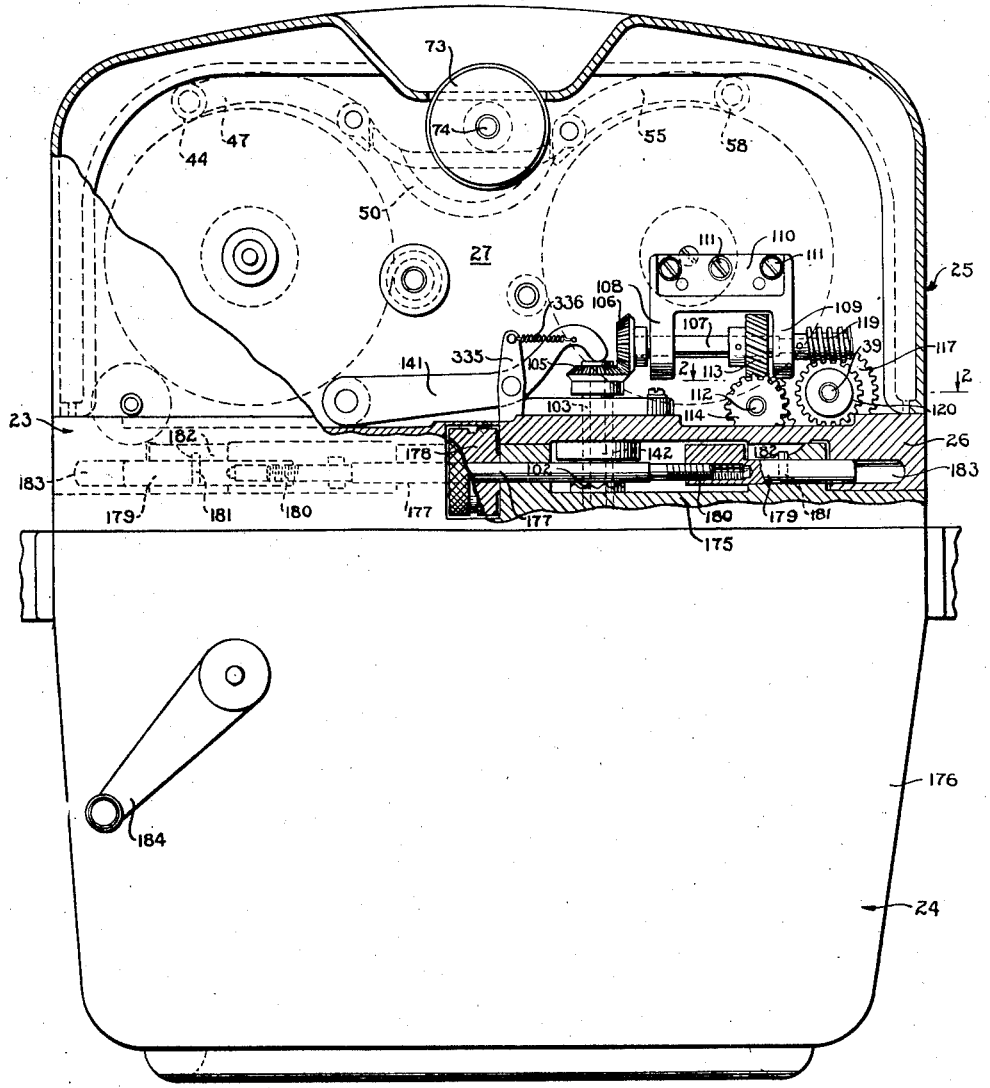

In the illustrated embodiment, the camera of the present invention is shown as having two major sections, i. e., a magazine 23 in which the film is housed, suitably positioned, and metered for exposure, and a cone 24 in which the driving and control mechanisms, the shutter and the lenses are mounted, said mechanisms, shutter and lenses being fully shown and described in the above-mentioned parent application. A cover 25 is provided for the magazine serving to keep said magazine dust and light-proof and to cooperate with parts of the magazine and perform other useful functions, to appear later. It will be noted that the section housing the film and the section housing the lenses are, by the present construction, adjacent each other permitting means, hereinafter more fully described, to be utilized which may fix the film plane independently of the accuracy with which the cone is mounted on said magazine.

Magazine and cover

Magazine 23 comprises a main casting 26 having two longitudinally spaced, upwardly extending walls 27 and 28 (Figs. 1, 3 and 6), which walls, in combination with cover 25, form a central chamber 29, in said magazine. Two film rolls 30 and 31 (Fig. 7) are adapted for rotation about fixed longitudinal axes in said chamber, and the unexposed film, preferably wound upon roll 30, is adapted to be unwound therefrom and exposed by means to be hereinafter more fully described, and then rewound upon roll 31. Rolls 30 and 31 are alike and of the standard type construction well-known to the art, having two end pieces of circular shape in the form of discs and a central cylinder of a lesser diameter than said end pieces upon which the film is wound.

Heretofore, film rolls for aerial cameras have been fixed for rotation in the magazines of said cameras by trunnions located at the centers of rotation. However, in the present device, in order to facilitate camera loading, this method of central support has been eliminated and novel means are provided whereby the film rolls are positioned for rotation about fixed longitudinal axes by merely inserting the rolls into the magazine chamber in the general direction of the final position which said rolls will assume. The novel means consist of a three-point support for each of the film roll end pieces, two of said supports in each instance serving to determine the film roll position and the third applying the pressure to fix the end pieces of the rolls in position for rotation with the supports.

As shown in Figs. 3 and 7, the supports determining the position of roll 30 are mounted on two shafts 32 and 33 which are journalled for rotation in walls 27 and 28 and which extend longitudinally therebetween. Mounted on the ends of the shaft 32 adjacent the internal faces of the walls 27 and 28, respectively, are supporting rolls 34 and 35 on which the end pieces of film roll 30 are adapted to rotate. Similarly mounted for the same purpose on shaft 33 are rolls 36 and 37 and a similar construction comprising shafts 38 and 39 and supporting rolls 40, 41, 42 and 43 is provided for mounting film roll 31.

Placing the end pieces of each film roll on the supports hereinbefore described determines the longitudinal axes of rotation for the film rolls. However, to fix the film roll end pieces so that they will remain in contact, and rotate with the supporting rolls, a third support adapted to be resiliently held against the end piece is provided. Rolls 44 and 45 (Figs. 3 and 7), secured to a shaft 46 for rotation therewith, function to hold film roll 30 as the third supports therefor, and are resiliently urged by means of a pair of arms 47 and 48 into engagement with the end pieces of said film roll. Arms 47 and 48 support shaft 46 and are pivotally mounted on a second shaft 49 which, in turn, is journalled in suitable bearings in an upper central portion 50 of the magazine casting. Portion 50 may be cast integrally with the main casting of the magazine or may be suitably affixed to said casting between walls 27 and 28. In order to resiliently urge rolls 44 and 45 into engagement with the end pieces, a pair of light coil springs 51 and 52 are wound about shaft 49. Each of said springs has one end thereof bearing upon one of the arms 47 or 48 and the other end thereof bearing upon portion 50 and each tends to expand and urge the arm with which it cooperates into engagement with film roll 30. The force exerted upon said roll due to said springs is only sufficient to prevent said roll from falling out of said magazine when the same is inverted with cover 25 removed, as, for example, when the film is being threaded into position. A structure which is the duplicate of the above-described means for holding roll 30 in operative position is also provided for holding roll 31 and comprises coil springs 53 and 54, arms 55 and 56 pivotal about a shaft 57 and rolls 58 and 59 mounted upon a shaft 60. Other resilient means, in the form of a leaf spring 60a, are also provided in cover 25 being suitably secured thereto to have the spring ends bear against the central portions of shafts 46 and 60 and thereby yieldingly urge the supporting rolls mounted on said shafts into engagement with the film rolls.

After inserting film rolls 30 and 31 into the magazine by merely raising shafts 60 and 46 (the cover being removed), and dropping said film rolls in position, the loading of the camera is effected by threading the film 61 (shown by a broken line in Fig. 7), from roll 30, over an idler roll 62, fixed to shaft 32 (Fig. 9), then under a pressure plate 63, and thence over a metering drum 64 to film roll 31, said metering drum being secured to and rotatable with shaft 39. The film is fixed to roll 31 by any suitable method, as, for example, by insertion of the end of the film into a slot arranged therefor in the cylinder of said roll.

After the film has been loaded into the magazine in the manner above described, cover 25 is placed thereon. The walls 27 and 28 (Fig. 6) have flanges 65 and 66, respectively, extending the length of the upper edges thereof and said flanges are adapted to fit into grooves 67 and 68, respectively, provided therefor in cover 25 and to thereby form a light trap keeping light from entering chamber 29. Similar light traps between the lower edge of said cover and magazine casting 26, comprising flanges 69 and 70 (Fig. 7) in said magazine and grooves 71 and 72 in said cover, complete the means whereby chamber 29 is kept light-proof. To keep the magazine interior dust-proof, an additional groove 71a is provided in main casting 26 along the edge thereof completely circumscribing the magazine interior and having a strip or washer 72a of some yielding substance such as rubber or felt fixed therein. The bottom of the cover when the latter is correctly positioned on the magazine fits over said strip and compresses the same, thereby producing a dust-proof joint or connection between said cover and cone.

Novel means are provided for locking cover 25 to magazine 23 by merely placing said cover over said magazine and then exerting a slight downward pressure thereon. After the cover has been thus fixed in position, release of said locking means can only be effected by rotation of a thumb screw 73 (Figs. 1 and 3) thus insuring against accidental or inadvertent removal of the cover during operation of the camera. As shown, said locking means comprises a shaft 74 mounted for rotation in bearings 75 and 76 located in walls 27 and 28, respectively, and in upwardly extending lugs 77 and 78 (Figs. 6 and 7) cast integrally with or rigidly fixed to portion 50 of the magazine casting. Shaft 74 has a part thereof projecting outside of wall 27 and has thumb screw 73 mounted on this projecting portion. A slot or opening 79 is provided in cover 25 in order that thumb screw 73 may extend through said slot and be operable from the exterior of said cover.

A pair of worms 80 and 81, preferably integral with shaft 74, are rotated thereby and are adapted to engage and rotate worm gears 82 and 83, respectively. Gear 82 is suitably secured to or integral with a vertical shaft 84 and the lower end of the latter extends through portion 50 and is held against axial movement by means of a collar 85 affixed thereto. A portion 86 of said shaft also extends upwardly above gear 82 and is suitably threaded so that a split nut 87 secured to cover 25 may engage the same. Said nut is split into two segments, each of which is pivotally mounted in a casting 88 fixed to cover 25 and a coil spring 89 is wound about said segments to keep the same together and normally operative as a single nut. However, threaded portion 86 of shaft 84 may be made to engage the split nut without being screwed into said nut by having the latter forced down upon it, thereby prying apart the segments of said nut against the constricting force of coil spring 89 and permitting said threaded portion to be grasped by said nut. Thumb screw 73 may be rotated thereafter to further increase the threaded engagement between nut 87 and portion 86, threading the latter into the former through the worm and gear 80, 82. A split nut means similar to that described above is provided for cooperating with worm and gear 81, 83, so that rotation of shaft 74 by thumb screw 73 also controls the locking and releasing of said unit. Both units are unlocked for removal of the cover by rotation of shaft 74, said shaft operating the worm and gear drives of the threaded shafts and causing rotation of said threaded shafts in a direction to unscrew the same from the split nuts.

In order to expose a new frame of film after each photograph is taken, metering drum 64 is rotated through a predetermined angular distance after each exposure and novel means are provided for maintaining the film in contact with said drum during rotation thereof so that the film may be accurately metered thereby. The novel means comprise a pressure roll 90 (Fig. 7) suitably mounted on a shaft 91 which is journalled at each end in a bracket 92, pivotally mounted by means of a pin 93 on the inner wall of cover 25. Resilient means, such as a leaf spring 94, are secured to said bracket, and when the cover is locked to the magazine, said resilient means urge pressure roll 90 against metering drum 64 pressing the film into frictional engagement with said drum. By mounting the pressure roll on the cover, the necessity for threading the film between rolls during loading is eliminated and the process of loading is accomplished more readily and more quickly than heretofore in cameras which had the pressure roll and the metering roll mounted in the magazine in fixed relation to each other.

Movement of the film by means of metering drum 64 rotates idler roll 62 and unwinds the film from film roll 30, causing the latter to rotate in a clockwise direction as viewed in Fig. 7. In order to frictionally resist the free rotation of said film roll and keep the film under a slight tension so as to minimize the possibility of wrinkling, means, such as a friction disc 95 (Fig. 9), are provided in the magazine for applying a frictional force which tends to retard the rotation of film roll 30. A hollow boss 96 is cast integrally with wall 27 of the magazine and friction disc 95 is mounted on a rod 97 which extends through said boss and has a collar 98 secured to the outer end thereof. Disc 95 is held in frictional engagement with the end piece of roll 30 by the expansive force of coil spring 99 interposed between said disc and the bottom of said boss and surrounding rod 97 within said boss. A pin 100, mounted in wall 27 and extending into an opening 101 in disc 95, holds said disc against rotary movement. A similar disc (not shown) is preferably provided in wall 28 directly opposite disc 95 for the other end piece of film roll 30. As a result, a pull must be exerted upon the film which is sufficient to overcome the resistance of the friction discs. The latter, in addition to keeping the film taut, serve to center the film roll between the walls 27 and 28, this being one reason why a pair of discs is provided.

Figure 2:
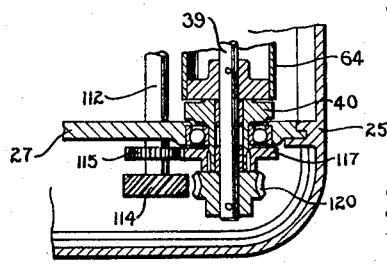
Fig. 2 is a sectional view of a part of the film roll drive taken substantially on line 2—2 of Fig. 1.

The film after passing from metering drum 64 is wound on roll 31, the latter being frictionally driven by supporting rolls 40 and 41 (Figs. 2 and 3) on which the end pieces of said film roll rest. The end pieces are adapted to slip on said supporting rolls while being driven thereby because the speed at which said supporting rolls tend to drive the film is in excess of the speed at which said film roll must rotate to take up all the film passing from the metering drum. As a result, the film is kept taut between said drum and said film roll while being wound upon the latter.

Means, located in the cone 24 and fully described in the aforementioned parent application, are provided for driving the mechanism which imparts rotary motion to the metering drum 64 for moving the film and to the two supporting rolls 40 and 41 for driving film roll 31. Said mechanism comprises an upper member of a jaw coupling 102 (Figs. 1 and 8) integral with or suitably fixed to a hollow shaft 103, said shaft being journalled for rotation in a set of ball bearings 104. A bevel gear 105 secured to the upper end of shaft 103 meshes with a bevel gear 106 affixed to a shaft 107 and is adapted to drive the latter which is journalled for rotation in suitable bearings mounted in a pair of downwardly extending arms 108, 109 of a bracket 110. The latter is secured by screws 111 to the outside face of wall 27 of the magazine casting.

To actuate supporting rolls 40 and 41, a shaft 112 is drivably connected to shaft 107 by means of a pair of engaging helical gears 113 and 114, the former being fixed to shaft 107 and the latter to the end of shaft 112. The latter extends through and is journalled for rotation in walls 27 and 28 and has secured thereto a pair of spur gears 115 and 116 (Fig. 3), gear 115 (Fig. 2) being mounted adjacent the outside face of wall 27 and meshing with spur gear 117. The latter is keyed to the hub of supporting roll 40, which bears on but rotates freely of shaft 39, and drives said roll. Spur gear 116 (Fig. 3) is similarly mounted adjacent the outside face of wall 28 and meshes with gear 118, to drive supporting roll 41 at the same speed and in the same manner as roll 40 is driven. Accordingly, film roll 31 is driven at both ends by supporting rolls 40 and 41 and applies a uniform force across the width of the film during the winding thereof.

Metering drum 64 is rotated by a worm 119 (Figs. 1 and 3) fixed to shaft 107 and a worm wheel 120 fixed to shaft 39, the latter shaft having said drum secured thereto for rotation therewith. The worm drive rotates drum 64 at a slower speed than the helical drive through which supporting rolls 40 and 41 are driven, producing the tension in the portion of film between said metering roll and the film roll.

In order to provide exact and clear photographs, a high degree of accuracy in fixing the film plane, so that it coincides with the focal plane, is necessary. Novel means, mounted in the magazine and adapted to cooperate with cone 24, are provided for locating the film plane, said means comprising pressure plate 63 (Fig. 7) and an accurately finished, plane surface 121 which fixes the position of the film and the pressure plate plane with relation to the lenses. Surface 121 which is a part of the cone casting is accurately finished in a plane and the lenses are subsequently adjusted to have the focal plane thereof coincide with said plane. Pressure plate 63 is preferably a metal casting, substantially rectangular in shape, having its lower face finished and grooved and being of sufficient size to cover an opening 122 in the upper end of the cone casting. The film is urged into contact with the base of said pressure plate by means to be described hereafter, and the sensitive side of said film is exposed in the direction of opening 122 so that a photographic impression may be made thereon when the shutter is released. Surface 121 is the top surface of a flange 123 integral with the upper end of the cone casting, said flange defining opening 122.

Normally, pressure plate 63 is yieldingly urged into contact with finished surface 121 of the cone casting by means comprising a pair of vertical arms or rods 124 and 125 (Fig. 6), mounted in recesses provided therefor in said pressure plate and held in said recesses by pins 126 and 127, respectively. A pair of inwardly extending lugs 128 and 129 cast integrally with wall 27 are provided having openings suitably bored therein in which rod 124 is slidably mounted and which guide said rod in any vertical movement thereof. A collar 130 is fixed to rod 124 between lugs 128 and 129 and a compressed coil spring 131 is mounted between said collar and upper lug 128, surrounding said rod and exerting an expansive force upon collar 130 which tends to move plate 63 in a downward direction into contact with cone surface 121. A similar structure to that above described, comprising lugs 132 and 133, coil spring 134 and collar 135, is provided in combination with rod 125 and exerts a downward force, augmenting the force of spring 131 upon the pressure plate. Rods 124 and 125 are loosely mounted in the openings provided therefor in the guiding lugs, an appreciable clearance existing between said openings and said rods in order that the base plane of the pressure plate may be aligned by the plane of finished surface 121 when brought in contact therewith even though the magazine is slightly askew in relation to the cone. As a result, pressure plate 62 is normally yieldingly held in the plane of finished surface 121, i. e., the focal plane of the camera lenses, and positions the film accordingly.

In order to expose a new frame of film after a photograph has been taken, the force normally exerted upon the film by pressure plate 63 must be overcome so that metering roll 64 may move the film. Accordingly, means are provided whereby pressure plate 63 is raised against the force of springs 131 and 134, relieving the pressure upon the film and permitting free movement thereof, said means, as shown, comprising a pair of arms or levers 136 and 137 which extend into slots 138 and 139, respectively. Slot 138 is adjacent to rod 124, being suitably positioned in the pressure plate casting to have pin 126 extend therethrough and to have said pin engaged by the pronged end of arm 136 (Fig. 7). Arm 137 similarly engages pin 127 and is, together with arm 136, secured to a shaft 140 for rotation therewith. Shaft 140 is journalled in walls 27 and 28 and has a portion thereof extending outside of wall 27, to which a lever 141 is affixed (Figs. 1, 3, 6 and 8). Lever 141 is adapted to rotate shaft 140 by transmitting thereto the reciprocal motion of a rod 142 (Fig. 8) so that whenever rod 142 is raised, lever 141 rotates in a counter-clockwise direction and likewise moves arms 136 and 137, thereby lifting pressure plate 63 sufficiently to clear the path of the film travel.

Rod 142 which reciprocates and actuates the above described mechanism for raising pressure plate 63 is mounted concentrically with shaft 103 in the hollowed center thereof. The reciprocal movement may be imparted to said rod by suitable cam means, such as are shown and fully described in said aforementioned parent application, said means being suitably timed to move rod 142 in an upward direction raising pressure plate 63 once after each exposure and keeping said pressure plate in a raised position during the interval in which the exposed frame of film is displaced by an unexposed frame. When said unexposed film frame has been suitably positioned between said pressure plate and surface 121 of the cone, the former is lowered into engagement with the latter and frictionally holds the film in the focal plane.

In order to eliminate any wrinkles or creases existent in the film after the same has been moved by metering roll 64 into position under pressure plate 63, novel means are provided whereby the film is urged by fluid pressure, against the base plane of said pressure plate, and is thereby smoothed out before being lowered into the fixed plane of cone surface 121. As a further precaution against wrinkling and creasing, and also to definitely fix the film in the focal plane, the same novel means are used a second time and urge the film into contact with the pressure plate when the shutter mechanism releases the shutter curtain to expose the film.

The novel fluid pressure means comprise a series of longitudinal and lateral channels or grooves 143 machined or cast in the base plane of pressure plate 63 in such a manner that when a plane surface of any nature is brought into contact with the base plane of said pressure plate, said grooves constitute a ground of fluid conduits each of which is connected to every other. An annular flange 144 (Figs. 6 and 7) preferably located at the center of pressure plate 63, is cast integrally with the upper surface of said pressure plate and has a cap or cover plate 145 secured thereto by means such as screws 146. Cap 145 is preferably formed with a raised central portion 147 and together with flange 144 constitutes a fluid chamber 148 which is connected by a number of openings or passages 149 to grooves 143. A flexible conduit 150 is suitably positioned to communicate with chamber 148 and, as shown, is threadedly secured at one end to upper portion 147 of cap 145 and at the other end to a part of the magazine casting (Fig. 5). A passage 151 in said casting is adapted to connect flexible conduit 150 to a second flexible conduit 152 when the cone and magazine are operatively assembled. A suitable washer 151a is interposed between conduit 152 and the end of a tube 151b which forms the lower portion of passage 151. The suction passage is broken at the washer when the magazine is removed from the cone.

Suitable means, such as are shown and fully described in the aforesaid parent application, may be provided in cone 24 for controlling the fluid pressure in flexible conduit 152 and, when the cone and magazine are assembled, said means through passage 151 and conduit 150 are operatively connected to fluid chamber 148 and, therefore, adapted to regulate the pressure therein. By decreasing the pressure in said chamber to subatmospheric pressure, a suction is created in grooves 143 whereby the film, even though loosely stretched across the base of pressure plate 63, is forced into contact with said base. In this manner, the film is fixed in the plane of the base of said pressure plate and when the latter is in lowered position and supported by finished surface 121, said base plane in which the film is fixed is coincident with the focal plane. Said pressure means also operate to fix the film in the focal plane immediately prior to the release of the shutter mechanism. It will be understood that the above described results may be produced by utilizing suitable pressure means to create a pressure above atmospheric in the camera cone and by opening grooves 143 to the atmospheric pressure in the magazine, thereby producing a pressure differential tending to force the film into contact with the pressure plate.

In order to indicate the number of exposures made upon the film, a counter (Figs. 3, 4 and 6) is provided in the magazine and is adapted to register each exposure by the movement of calibrated drum 154 past stationary index mark 155, said drum and mark being visible through a window 156 (Fig. 6) conveniently positioned in the cover. A casing 157 surrounds drum 154 exposing only the portion visible through window 156 and, as shown, is attached to wall 28 by a screw 158. A ratchet wheel 159 (Figs. 3 and 4) is integral with or suitably fixed to drum 154 and is provided with a hub member 160, the unit being rotatably mounted on a shaft 161 fixed between casing 157 and magazine wall 28. A coil spring 162, having one end thereof secured to a flange 163 on hub member 160 and the other end fixed to wall 28, normally opposes rotary movement of ratchet wheel 159 and always tends to return drum 154, after rotation of the same, to zero position.

Since the pressure plate and, therefore, rods 124 and 125 are raised once for every exposure, every upward movement of said rod 125 is utilized in the present invention to motivate the means for rotating ratchet wheel 159 and drum 154 to indicate another exposure. Said means comprise a lever 164 (Fig. 4) having a bifurcated end which fits into a slot 165 provided therefor in arm 125, and which engages a pin 166 fixed to said arm and extending through said slot. The other end of lever 164 is secured to a shaft 167 which is journalled in and extends through wall 28 and which has a second lever 168 fastened thereto on the other side of said wall. Levers 164 and 168 and shaft 167 rotate as a unit and, therefore, when arm 125 moves upward, lever 168, on the opposite side of the fulcrum moves downward. A pawl 169, pivotally mounted on the end of lever 168 and resiliently urged by a spring 170 in the direction of ratchet wheel 159, engages said wheel when said lever is moved downward and rotates the former a predetermined number of notches, thereby rotating drum 154 a single graduation past index mark 155. When lever 168 is moved upward, moving pawl 169 therewith, a pin 171, fixed to wall 28 and extending perpendicularly therefrom, is adapted to engage pawl 169 and cause the same to disengage from ratchet wheel 159.

Novel means, rendered operable by pressing cover 25 into locked position with magazine 23, are provided for holding ratchet wheel 159 against rotation by spring 162, in a direction to return indicating drum 154 to a zero reading. Said means comprise a cantilever spring 172 fixed to casing 157 and having a curved end extending downwardly in the direction of ratchet wheel 159, said end being adapted to hold said wheel, as viewed in Fig. 4, against rotation in a counter-clockwise direction, when moved into engagement therewith. A member 173 slidably mounted in casing 157 is supported by spring 172 and when cover 25 is removed extends beyond the upper surface of said casing. However, when said cover is replaced, a part thereof, in the form of lug 174 (Fig. 6) bears against and moves member 173 downward, thereby moving spring 172 into engagement with ratchet wheel 159. As a result, whenever cover 25 is removed from magazine 23, indicating drum 154 is returned to zero position by the action of spring 162, so that indicating drum 154 usually registers the number of exposures made from the time the cover has been positioned on the magazine.

After a film roll has been fully exposed or perhaps during exposure thereof, an occasion for removal of the magazine from the cone may arise. A novel safety latch is provided in combination with pressure plate actuating lever 141 for holding the pressure plate in lowered position against the magazine casting, thereby preventing admittance of light into the magazine. The novel latch comprises a lever 335 (Figs. 1 and 8) pivotally mounted intermediate the ends thereof to lever 141 in a substantially vertical position. The upper end of lever 335 is resiliently urged, by a spring 336 fixed between said end and lever 141, to move in a clockwise direction. The lower end of lever 335 extends through an opening 337 in the magazine base and is provided with a pair of notches or openings 338 and 339, the former being positioned above the latter, and being adapted to engage a plate 340 suitably affixed to the base of the magazine and projecting beyond opening 337. With the cone removed, pressure plate 63 is in lowered position and spring 336 urges lever 335 in a direction to have plate 340 engage notch 338 and hold the pressure plate in the lowered position against any accidental or inadvertent raising thereof. When the cone is fixed to the magazine, a lug 341 shown in broken lines in Fig. 8 engages the lower end of lever 335 and moves said lever and the notches therein away from plate 340, and out of engagement with said plate, thereby leaving actuating lever 141 unaffected during the cyclic operations.

It is often desirable, as, for example, when threading the film from roll 30 to roll 31, to have pressure plate 63 held in raised position, and for this purpose, notch 339 is provided in lever 335. After removal of the magazine, lever 335 may be manually operated and raised so that notch 339, instead of notch 338, engages plate 340, thereby holding actuating lever 141 and pressure plate 63 in raised position.

Cone 24 comprises a central casting 175 substantially square in horizontal cross-section. A casing 176, affixed to said casting and surrounding the same, encloses suitable driving and control mechanisms, which are mounted on said casting and fully disclosed in the aforesaid parent application. Locking means are provided for securing magazine 23 to said cone and, as shown in Fig. 1, said locking means comprise a shaft 177 mounted for rotation in casting 175 and adapted to be rotated by a thumb screw 178 mounted on and secured to said shaft intermediate the bearings therefor and readily accessible from the outside of casing 176. Rotation of shaft 177 by thumb screw 178 causes axial movement of members 179 into which ends 180 of said shaft are threaded, said members being slidably mounted in casting 175 and constrained to axial movement by pins 181 fixed therein and radially extending therefrom, into longitudinal grooves 182 in said casting. The longitudinal displacement of members 179 caused by rotation of thumb screw 178 moves said members into or out of openings 183 provided therefor in magazine 23 and locks or unlocks cone 24 into or from operative position upon said magazine. In the embodiment illustrated, as shown in Fig. 6, a second lock, of like construction to the above, is provided in the cone, and engages the opposite side of magazine 23.

There is thus provided a camera apparatus having novel means for mounting, metering and exposing the film. The metering means are cooperable in a novel manner with the cover of the film magazine, being mounted in part in said cover in order to facilitate film threading and loading and to insure an accurate metering of the film during operation of the camera. Film rolls are carried in the magazine by novel means comprising a plurality of three point supports, and the film metering means are associated in a novel manner with said film rolls and the actuating mechanism. A plurality of novel safety devices are also provided in the magazine and cover to cooperate with the film metering, holding and actuating mechanisms, said devices including light traps and automatic and semi-automatic locking means.

Although only a single embodiment of the invention has been illustrated and described, it is to be expressly understood that the same is not limited thereto. For example, it will now be apparent to those skilled in the art that the novel three point film roll supports are not restricted to utility in an aerial camera but can be used in other film holding and metering apparatus. Various changes may be made in the design and arrangement of parts without departing from the spirit and scope of the invention. For a definition of the invention, reference will be had primarily to the appended claims.

What is claimed is:

1. In a camera having a magazine and a casing detachably secured to said magazine, a pair of film rolls with disc-like end pieces, a three-point support for each of said rolls, each of said three-point supports including three rotatable members engaging the periphery of the film roll end pieces, a pivotable arm carrying one of said members, and spring means engaging said arm to keep the member carried thereby in frictional engagement with said end pieces, resilient means carried by said casing, said resilient means engaging the pivotally mounted member of each of said three-point supports to augment the action of said spring means, and spring pressed means frictionally engaging the side walls of each of the film roll end pieces to locate each of said rolls longitudinally.

2. In a camera magazine having a cover secured thereto and a pressure plate mounted therein, a film supply roll, a film receiving roll, said rolls being disposed above said pressure plate, an idler roll for guiding the film from said supply roll under said pressure plate, said idler roll being located adjacent one edge of said plate, a metering drum adjacent the opposite edge of said plate for directing the film to the receiving roll whereby the path of travel of said film is substantially reversed, means carried by said cover for resiliently urging said film into greater frictional engagement with said metering drum, said last-named means engaging a portion of the film normally in contact with said drum, drive means, means positively connecting said drive means to said metering drum, and means frictionally connecting said drive means to said receiving roll.

3. In a camera magazine having a cover secured thereto and a pressure plate mounted therein, a film supply roll, a film receiving roll, said rolls being disposed above said pressure plate, an idler roll for guiding the film from said supply roll under said pressure plate, said idler roll being located adjacent one edge of said plate, a metering roll adjacent the opposite edge of said plate for directing the film to the receiving roll whereby the path of travel of said film is substantially reversed, means pivotably mounted on said cover for resiliently urging said film into greater frictional engagement with said metering drum, said last-named means engaging a portion of the film normally in contact with said drum, and driving means connected to said receiving roll and to said metering drum.

4. In a camera magazine having a cover secured thereto and a pressure plate operatively mounted therein, a film supply roll, a film receiving roll, said rolls being disposed above said pressure plate, an idler roll for guiding the film from said supply roll to said pressure plate, said idler roll being located adjacent one edge of said plate, a metering drum adjacent the opposite edge of said plate for directing the film to the receiving roll whereby the path of travel of said film is substantially reversed, mechanism adapted to augment the frictional engagement between said metering drum and the film, said mechanism being pivotally mounted on said cover and being resiliently urged in the direction of a portion of said metering means normally in contact with the film, driving means operatively connected to said metering drum, a member frictionally engaging said receiving roll to drivably connect the latter to said driving means, and resilient means carried by said cover for pressing said receiving roll into engagement with said member.

5. In a camera having a magazine and a cover detachably secured to said magazine, a film roll with disc-like end pieces, a three-point support for said roll comprising three rotatable members engaging the periphery of the film roll end pieces, a pivotable arm carrying one of said members and spring means in said magazine for engaging said arm to urge the member carried thereby into frictional engagement with the end pieces, and resilient means carried by said cover, said resilient means engaging the pivotably mounted member of the support and augmenting the action of said spring means when said cover is secured to said magazine.

6. In a camera having a magazine and a cover detachably secured to said magazine, a film roll with disc-like end pieces, a three-point support for said roll comprising three rotatable members engaging the periphery of the film roll end pieces, a pivotable arm carrying one of said members, spring means in said magazine for engaging said arm to press the member carried thereby into frictional engagement with the end pieces, resilient means carried by said cover, said resilient means engaging the pivotably mounted member of the support and augmenting the action of said spring means, and drive means for said roll connected to one of said members.

AMBROSIUS BRIECHLE.
GEORGE E. MERRITT.
ROY T. HURLEY.